E. A. LELAND.
ATTACHING HOSE TO HOSE-COUPLING.

No. 186,855. Patented Jan. 30, 1877.

Witnesses:
Henry Eichling
Edward Holly

Inventor:
Edwin A. Leland.
James A. Whitney

UNITED STATES PATENT OFFICE.

EDWIN A. LELAND, OF BROOKLYN, NEW YORK, ASSIGNOR TO LEONARD RICHARDSON, OF SAME PLACE.

IMPROVEMENT IN ATTACHING HOSE TO HOSE-COUPLINGS.

Specification forming part of Letters Patent No. 186,855, dated January 30, 1877; application filed January 13, 1877.

*To all whom it may concern:*

Be it known that I, EDWIN A. LELAND, formerly of New York city, but now residing in the city of Brooklyn, county of Kings, and State of New York, have invented an Improvement in Means of Attaching Hose to Hose-Couplings, of which the following is a specification:

The object of this invention is to provide an absolutely tight and secure means of attaching hose to hose-couplings, whereby the loss and danger incident to the disruption of the hose from the coupling when in use is wholly obviated.

To this end the invention comprises a novel combination of a tapering binding-ring with a peculiarly-constructed shank provided upon the hose-section to which the hose is to be attached.

Figure 1:
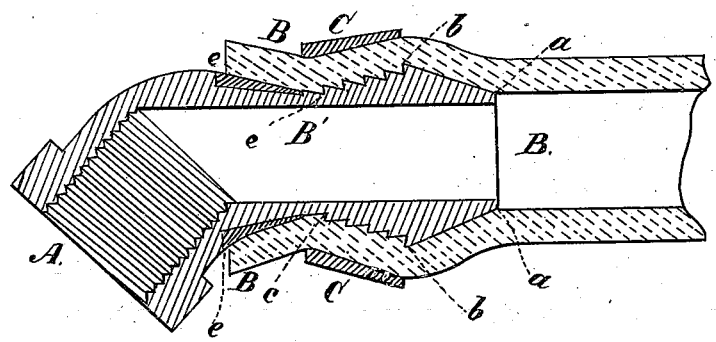
Figure 2:
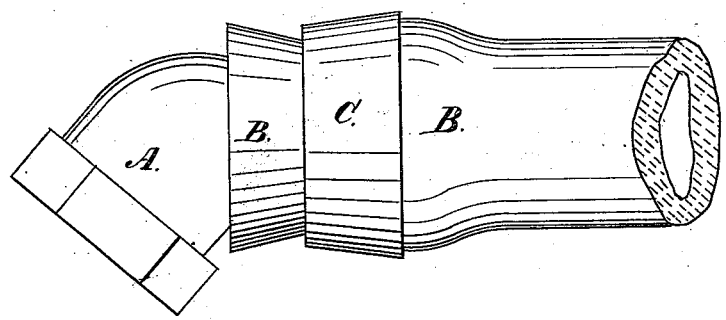
Figure 3:
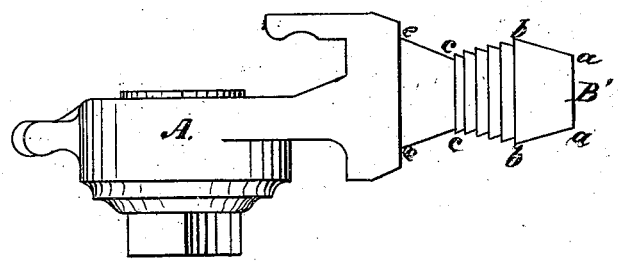

Figure 1 is a longitudinal sectional view of a section of a coupling made according to my invention, and Figs. 2 and 3 are side views of the same.

A represents one of the halves or sections of a hose-coupling, said hose-coupling, so far as concerns the connection of the two sections, being of any ordinary or suitable construction. The shank B', however, of the coupling is of the peculiar structure represented in Figs. 1 and 2—that is to say, at its extremity is tapered, as from $a$ to $b$, then diminished, as from $b$ to $c$, and then enlarged upon a taper opposite to that at $b\ c$, as from $c$ to $e$.

When desired, the taper $b\ c$ may be circumferentially corrugated, as represented in the drawing.

B is the end of the india-rubber or other hose to be attached to the coupling-section, and C is a binding-ring of somewhat tapering form, as clearly indicated in the drawings.

In the attachment of the hose to the coupling, the tapering end $a\ b$ of the shank B' is inserted into the end of the hose B, and thrust therein as far as is consistent with the passage upon said end of the hose of the ring C, the ring C being passed over the opposite extremity of the coupling-section A, upon and around the extremity of the hose B. This done, the shank B' of the section A is driven inward, and simultaneous with this the ring C is pushed inward upon the hose until the end of the hose is spread or expanded upon the tapering portion $c\ e$ of the shank B', and until the ring C is jammed fast upon the hose B concentric with the taper $b\ c$, the flaring of the extremity of the hose upon the taper $c\ e$ giving a taper to the extremity of the hose opposite to that of the portion clamped or held by the binding-ring C, as just herein explained. As a consequence of this, the binding-ring is prevented from slipping back from its hold upon the hose concentric with the taper $b\ c$, and the hose is thereby securely and firmly held and attached to the hose-section A against any pressure that can be brought thereon in the practical or actual working of the hose in connection with the coupling.

What I claim as my invention is—

The combination, with a coupling-section, A, constructed with the tapering portions $a\ b$, $b\ c$, and $c\ e$, as described, of the tapering binding-ring C and the hose B, the whole co-operating substantially as and for the purpose herein set forth.

EDWIN A. LELAND.

Witnesses:
    H. WELLS, Jr.,
    EDWARD HOLLY.